(12) United States Patent
Verde Preckler et al.

(10) Patent No.: US 7,896,289 B2
(45) Date of Patent: Mar. 1, 2011

(54) AIRCRAFT TAIL ASSEMBLY

(75) Inventors: Jorge Pablo Verde Preckler, Madrid (ES); José Alberto Cabello Moreno, Madrid (ES)

(73) Assignee: Airbus España, S.L., Madrid (ES)

( * ) Notice: Subject to any disclaimer, the term of this patent is extended or adjusted under 35 U.S.C. 154(b) by 487 days.

(21) Appl. No.: 11/904,628

(22) Filed: Sep. 27, 2007

(65) Prior Publication Data

US 2009/0026311 A1    Jan. 29, 2009

(30) Foreign Application Priority Data

Jul. 27, 2007 (ES) ................... 200702114

(51) Int. Cl.
*B64C 5/06* (2006.01)
(52) U.S. Cl. .......................... 244/91; 244/87
(58) Field of Classification Search .............. 244/87, 244/91, 99.11, 218, 219; D12/337, 338
See application file for complete search history.

(56) References Cited

U.S. PATENT DOCUMENTS 2,070,809 A * 2/1937 Root ........................... 244/87
2,356,139 A * 8/1944 Allen et al. ................... 244/91
2,387,526 A * 10/1945 Nagamatsu ................. 244/198
4,448,372 A * 5/1984 Larson ........................ 244/87
4,913,378 A * 4/1990 Calvert ........................ 244/46
5,908,175 A * 6/1999 Magnes ....................... 244/119

* cited by examiner

*Primary Examiner*—Tien Dinh
*Assistant Examiner*—Michael Kreiner
(74) *Attorney, Agent, or Firm*—Ladas & Parry LLP

(57) ABSTRACT

An aircraft tail assembly planform comprising curvilinear leading edges (21) and trailing edges (22), with an aircraft tail assembly configuration in which the hinge line (13) is rectilinear and has a non-constant percentage with respect to the chord (50) in each section (51), being the front (11) and rear (12) spars rectilinear with a non-constant percentage with respect to the chord (50) in each section (51), or being these spars (11, 12) curvilinear with a constant or non-constant percentage with respect to the chord (50) in each section (51). Moreover, the invention describes an aircraft tail assembly planform comprising rectilinear leading edges (21) and trailing edges (22), in which the hinge line (13) has a non-constant percentage with respect to the chord (50) in each section (51), being the front (11) and rear (12) spars rectilinear, with a constant or non-constant percentage with respect to the chord (50) in each section (51), or being these spars (11, 12) curvilinear, with a constant or non-constant percentage.

18 Claims, 5 Drawing Sheets

AIRCRAFT TAIL ASSEMBLY

FIELD OF THE INVENTION

The invention relates to the planform, to the rudder shape and to the internal structure of aircraft tail assemblies, specifically for large civil use aircraft.

BACKGROUND OF THE INVENTION

An aircraft tail assembly is typically formed from a horizontal tail and another vertical tail. The horizontal tail is in charge of the pitch control and stability of the aircraft, whereas the vertical tail is in charge of the lateral control and stability of such aircraft. The planform of a tail assembly is the contour of the projection on its plane, the aerodynamic properties thus depending to a great extent on this planform. The tail assembly rudder is the moving part thereof which allows controlling the aircraft.

The tail assembly span is the size of the tail assembly in a direction perpendicular to the impinging current, a tail assembly section being considered as a tail assembly slice in the direction of the impinging air current. The chord in a specific section is therefore the size of the tail assembly in that section, the chord at the root and the chord at the tip being the chords at the root and at the tip of the tail assembly, respectively. The chord distribution is the mathematical function expressing the chord according to the position along the span. This function is normally a decreasing function, being constant for the case of rectangular tail assemblies.

The aerodynamic lift is the aerodynamic force supported by the tail assembly in the direction perpendicular to the impinging air current. The aerodynamic drag is the aerodynamic force supported by the tail assembly in the direction of the impinging current.

Some important factors to be taken into account in the first stages of studying an airplane are: the area enclosed by the planform or total surface; the distance from the tail assembly to the center of gravity of the airplane and the surface of the rudder with respect to the total surface. Once these parameters are set, the design consists of optimizing the tail assembly, minimizing its weight, its aerodynamic drag, its manufacturing costs and improving the efficiency of the rudder.

There are several possible tail assembly planforms for aircraft. The simplest planforms are rectangular or trapezoidal. Wings (not tail assemblies) were historically manufactured with elliptical planforms, because the aerodynamic wing theory predicts that this planform minimizes aerodynamic drag. It is currently known that an elliptical planform is more expensive to manufacture and heavier than a trapezoidal planform and that the aerodynamic drag loss is small.

Rectangular and trapezoidal planforms of tail assemblies are the most widely used due to the fact that they have a great structural rigidity and simplicity, while at the same time they are planforms which can easily be analyzed by computer and can be manufactured inexpensively. However, for high-performance applications they do not provide a multidisciplinary optimum if weight, aerodynamic drag and manufacturing costs are taken into account.

The internal structure of an aircraft tail assembly traditionally comprises two main spars, a front spar and a rear spar, distributed along the span, closing the aircraft tail assembly structure or box. The position of the front and rear spars in each section is a constant percentage of the chord in each section. A typical percentage of the position of the front spar would therefore be 20% of the chord in each section, whereas a typical percentage of the position of the rear spar would be 55% of the chord in each section. There are tail assemblies with three or more spars but their position is always a constant percentage of the chord in each section.

In a similar manner, the hinge line of the rudder (elevator or rudder) has a constant percentage along the span, typically 70% of the chord in each section. Due to its function as an axis about which the rudder rotates, the hinge line must be rectilinear, although it is not necessary for it to have a constant percentage of the chord in each section, this being the object of the present patent.

The multidisciplinary optimization of an aircraft tail assembly (hereinafter multidisciplinary optimization) consists of modifying its planform, the size of the rudder, the position of its hinge line and the position of its spars such that its weight, its aerodynamic drag, the efficiency of its rudder and its manufacturing costs are simultaneously optimized.

The object of the present patent is to provide innovative planforms, rudder shapes, position of the hinge line and position of the spars, based on a multidisciplinary optimization and for an aircraft tail assembly.

SUMMARY OF THE INVENTION

The object of this invention is to optimize an aircraft tail assembly in a multidisciplinary manner. The present invention achieves this object by means of an innovative planform with curvilinear leading and trailing edges decreasing the bending moment distribution and therefore the weight. The invention additionally develops a non-constant percentage position of the hinge line of the rudder with respect to the chord in the chord in the sections. Finally, the invention further develops an internal structure based on curvilinear spars or rectilinear spars with a non-constant percentage position with respect to the chord in the sections.

Other features and advantages of the present invention will be understood from the following detailed description of an illustrative embodiment of its object in relation to the attached figures.

DETAILED DESCRIPTION OF THE INVENTION

Figure 1:
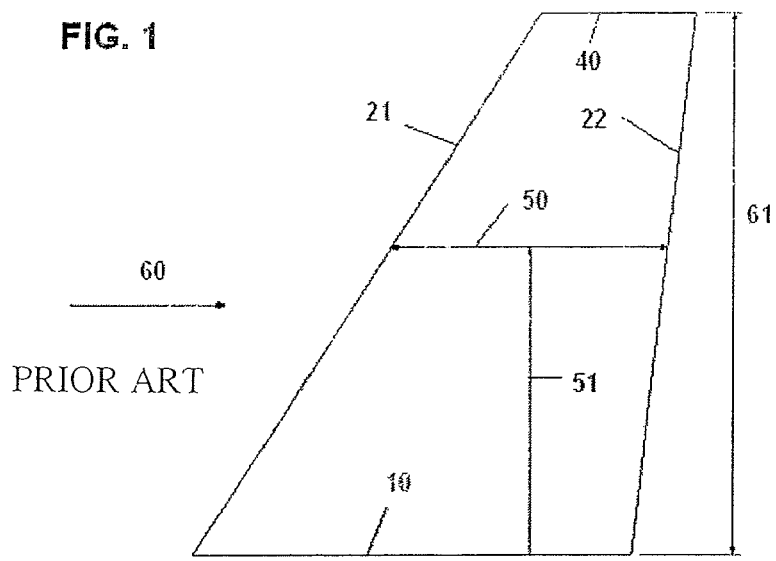
FIG. 1 shows a schematic view of a conventional tail assembly planform for aircraft.

As can be seen in FIG. 1, the aircraft tail assembly planform comprises a leading edge 21 and a trailing edge 22, the distance between the leading edge 21 and the trailing edge 22 being defined as chord. There is thus a chord 10 at the tail assembly root, a chord 10 at the tail assembly tip, and a chord 50 in a section located at any distance 51 from the chord 10 of the root, always with respect to the direction of the impinging air current 60. The tail assembly span 61 is the size of the tail assembly in a direction perpendicular to the impinging current 60.

Figure 2:
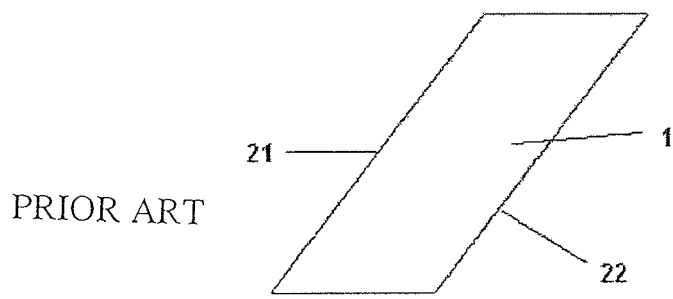
FIG. 2 shows a schematic view of a conventional rectangular tail assembly planform for aircraft, with the leading edge and the trailing edge parallel to one another.
Figure 3:
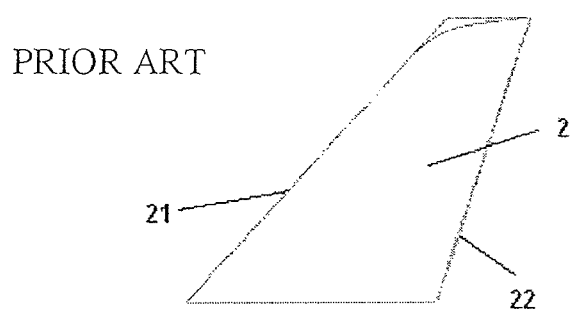
FIG. 3 shows a schematic view of a conventional trapezoidal tail assembly planform for aircraft with the leading edge and the trailing edge secant to one another.
Figure 4:
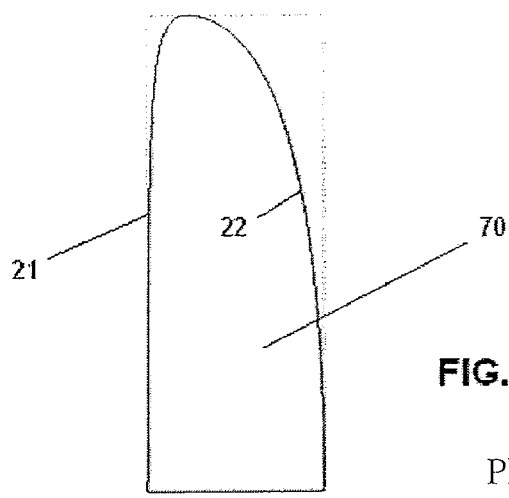
FIG. 4 shows a schematic view of a historic elliptical wing planform for aircraft.

As observed in FIGS. 2 and 3, the aircraft tail assembly planforms, particularly large civil use aircraft, conventionally have rectangular planforms 1 or trapezoidal planforms 2, with rectilinear leading edge 21 and trailing edge 22. These planforms simplify the estimation of the aerodynamic properties. As observed in FIG. 4, elliptical planforms 70 also exist in the known art, which planforms are applied exclusively to wings, not to tail assemblies, the objective of which was to minimize their aerodynamic drag and not optimize in a multidisciplinary manner.

Figure 5:
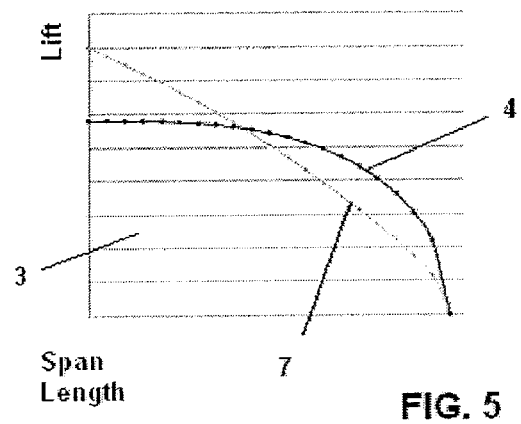
FIG. 5 shows the lift distribution along the conventional aircraft tail assembly span with a rectangular and trapezoidal planform.

The lift distribution 4 along the tail assembly span 61 when the planform is rectangular 1, the leading edge 21 and the trailing edge 22 being parallel, can be observed in FIG. 5.

The integral of the previous curve 4, equal to the area 3 enclosed under the lift curve 4, provides the total lift of the tail assembly. Tail assemblies are sized and designed according to the total lift that they provide, this being a design limitation. However, a different shape can be provided to the previous lift curve 4 as long as this area 3 remains constant, the total lift therefore being constant.

On the other hand, the aerodynamic theory predicts that the lift of a section varies according to the following parameters, among others:

it increases with the chord 50 of section 51;

it decreases with the position of section 51 along span 61, reaching zero at tip 40;

According to the one-dimensional beam theory of the strength of materials, the bending moment distribution along the tail assembly span 61 is obtained by integrating the lift distribution 4 multiplied by the arm of this lift until section 51, in which the bending moment is being calculated.

Figure 6:
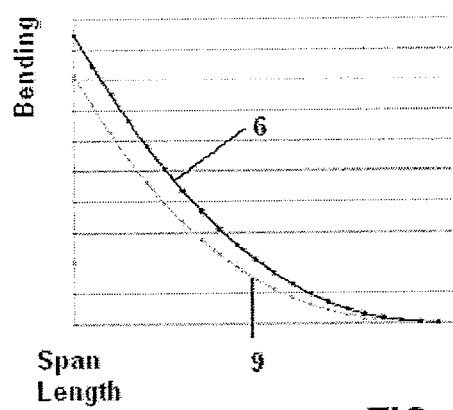
FIG. 6 shows the bending moment distribution along the conventional aircraft tail assembly span with a rectangular and trapezoidal planform.
Figure 7:
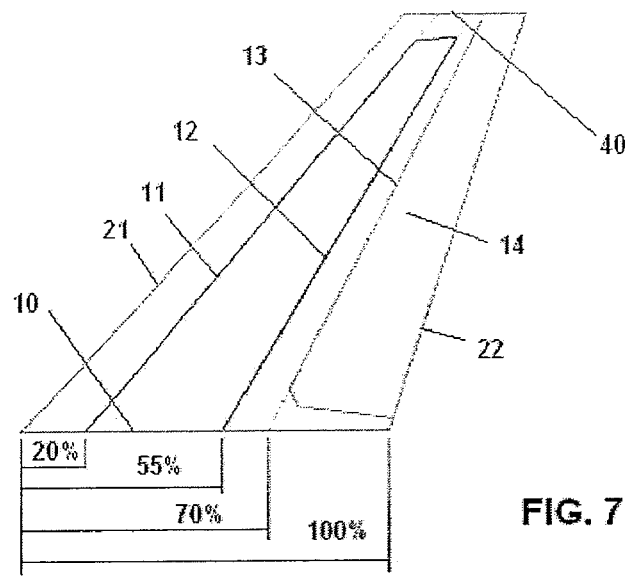
FIG. 7 shows the position of the spars in the conventional aircraft tail assembly with a trapezoidal planform.

According to the foregoing, the resulting bending moment distribution 6 in a rectangular aircraft tail assembly planform structure 1 is that shown in FIG. 6.

In addition, the structural weight of an aircraft tail assembly depends, among other factors, on the bending moment to which each section 51 is subjected. A planform with larger chords at the root 10 and smaller chord at the tip 40, keeping the total lift constant, involves a lower bending moment distribution since the lift distribution is closer to the root, the tail assembly weight therefore decreasing.

A commonly used form to achieve the above consists of implementing a trapezoidal aircraft tail assembly planform 2. Given that the lift of a section 51 is proportional to the chord 50 of the section, a trapezoidal tail assembly 2 has lift distribution 7 with higher lifts close to the root 10 and lower lifts close to the tip 40, such as that observed in FIG. 5.

In the same way as for the case of a rectangular tail assembly 1, the bending moment distribution 9 for a trapezoidal tail assembly 2 can be observed in FIG. 6.

Although the trend in a first approach is the one shown, there are other factors that affect the weight, the aerodynamic drag and the efficiency of the rudder to a lesser extent. Some of these factors are the following:

the viscous boundary layer of the fuselage;

influence of the wing and the fuselage;

technological manufacturing limitations;

deformations due to buckling;

induced, parasite and interference aerodynamic drags;

All these factors can be taken into account by means of computer calculations and the calculation power of current computers even allows doing so with non-conventional planforms.

Apart from optimizing the tail assembly planform, it is possible to innovate the internal structure configuration of the tail assembly, specifically the position of the front spar 11 and rear spar 12, modifying their percentage position with respect to the chord in each section optimizing the tail assembly in a multidisciplinary manner.

The tail assembly box is the internal structure mainly supporting the aerodynamic stress. It comprises two or more spars 11, 12 coated by an upper and lower skin forming a closed box. The larger the box, the more efficiently it supports stress and therefore the less it weighs, until a certain limit imposed by the buckling, by manufacturing limits and other airworthiness requirements. The complexity of the analysis of a box can only be carried out with the accuracy required by current aviation by means of computational calculations. The increase of computational power in the last decade allows calculating by computer the behavior of a box with curvilinear spars, being able to optimize the optimal curvature of the latter in a multidisciplinary matter.

Finally, the efficiency of the tail assembly rudder 14 depends, among other factors, on the percentage at which the hinge line 13 is located. The larger the size of the rudder 14 (lower percentage), the greater the efficiency. Due to three-dimensional aerodynamic effects, the rudder 14 is at the limit of its control capacity close to the tail assembly tip 40, whereas the rudder 14 has a margin for generating more control capacity at the tail assembly root 10. In addition, due to the fact that the total incremental lift generated by the rudder upon being deflected is of interest for the purposes of designing a tail assembly, as occurs for the entire tail assembly, the closer the lift distribution caused by the rudder 14 is to root 10, the smaller will the bending moment due to the lift be and therefore the smaller will the weight of the tail assembly be. Additionally, the volume between the rear spar 12 and the hinge line 13 is empty, except for the actuators (typically two) driving the deflection of the rudder 14. The size of the actuators and the need for a sufficient gap between the rear spar 12 and the hinge line 13 is a design restriction. This restriction occurs in one or several point sections and not in the entire length of the tail assembly, such that the size of the rudder 14 can be extended by moving it closer to the rear spar 12 in the areas in which the actuators are not located. Taking into account these three factors, a rectilinear hinge line 13 in which the percentage with respect to the chord 50 in each section 51 is not constant is an additional variable which can be used to optimize the tail assembly in a multidisciplinary manner.

Figure 8:
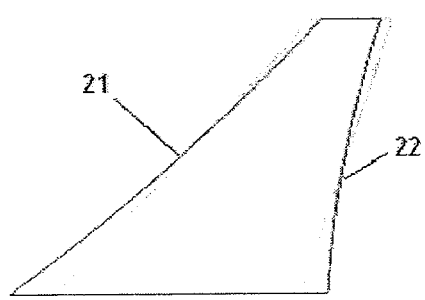
FIGS. 8 and 9 show schematic views of tail assembly planforms with curvilinear leading and trailing edges, according to the present invention.
Figure 9:
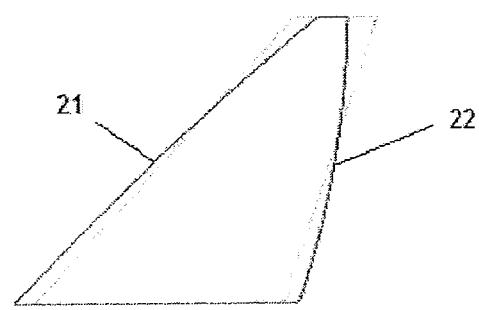

Having put forth the foregoing and taking into account the progress made in the field of Computer Fluid Dynamics (CFD), and in the field of computers, the present invention proposes:

for aircraft tail assembly planforms: new curvilinear leading edges 21 and trailing edges 22 as shown in FIGS. 8 and 9;

for the form and configuration of the aircraft tail assembly rudder: a new rectilinear rudder hinge line 13 with a non-constant percentage position with respect to the chord in each section;

for the internal structure of aircraft tail assemblies: new rectilinear front 11 and rear 12 spars with a non-constant percentage position with respect to the chord in each section;

for the internal structure of aircraft tail assemblies: new curvilinear front 11 and rear 12 spars with a constant percentage position with respect to the chord in each section;

for the internal structure of aircraft tail assemblies: new curvilinear front 11 and rear 12 spars with a non-constant percentage position with respect to the chord in each section.

Figure 10:
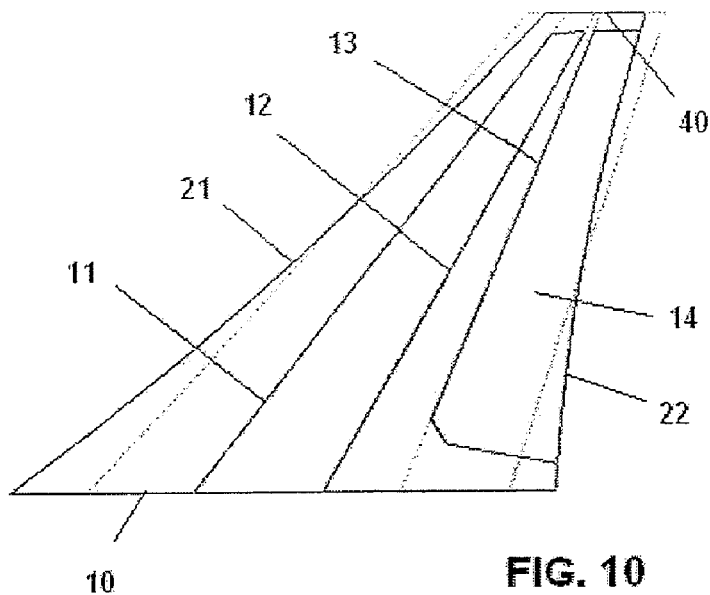
FIG. 10 shows the planform, position of the hinge line of the rudder and the position of the spars in the tail assembly for aircraft according to a first embodiment of the present invention.

According to a first embodiment of the invention, an aircraft tail assembly planform with concave curvilinear leading 21 and trailing 22 edges is proposed, an internal structure of an aircraft tail assembly with rectilinear front 11 and rear 12 spars with a non-constant percentage with respect to the chord in each section is proposed and an aircraft tail assembly configuration with the hinge line 13 with a non-constant percentage with respect to the chord in each section is proposed, as shown in FIG. 10. The position of all these elements can be fixed while optimizing the tail assembly in a multidisciplinary manner by means of advanced computer calculations.

Figure 11:
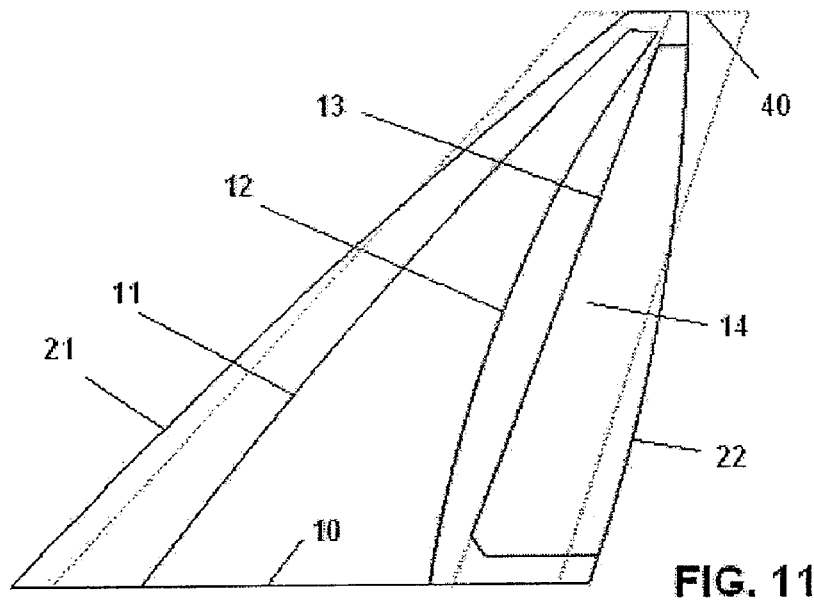
FIG. 11 shows the planform, position of the hinge line of the rudder and the position of the spars in the tail assembly for aircraft according to a second embodiment of the present invention.

According to a second embodiment of the invention, an aircraft tail assembly planform with convex curvilinear leading 21 and trailing 22 edges is proposed, an internal structure of an aircraft tail assembly with curvilinear front 11 and rear 12 spars with a constant percentage with respect to the chord in each section, or tracing an optimal non-constant percentage curve is proposed, and an aircraft tail assembly configuration with the hinge line 13 with a non-constant percentage with respect to the chord in each section is proposed, as shown in FIG. 11. In the same way as in the first embodiment, the position of all these elements will be optimized in a multidisciplinary manner by means of advanced computer calculations.

Figure 12:
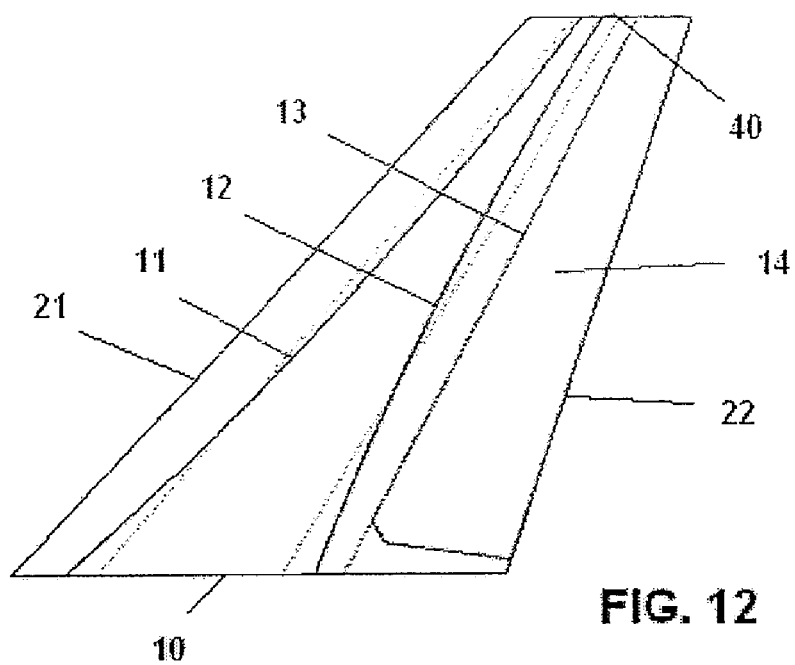
FIG. 12 shows the planform, position of the hinge line of the rudder and the position of the spars in the tail assembly for aircraft according to a third embodiment of the present invention.

According to a third embodiment of the invention, an aircraft tail assembly planform with rectilinear leading 21 and trailing 22 edges is proposed, an internal structure of an aircraft tail assembly with curvilinear front 11 and rear 12 spars. In FIG. 12, these are depicted with non-constant percentages with respect to the chord in each section, an aircraft tail assembly configuration with a hinge line 13 with a non-constant percentage with respect to the chord in each section further being proposed, as shown in FIG. 12. However, said curvilinear spars may also be provided at constant percentages with respect to the chord in each section as depicted in FIG. 11. In the same way as in the first and second embodiments, the position of all these elements will be optimized in a multidisciplinary manner by means of advanced computer calculation.

The modifications comprised within the scope defined by the following claims can be introduced in the embodiments which have just been described.

The invention claimed is:

1. An aircraft tail assembly having a chord and a span which assembly comprises a curvilinear leading edge and a curvilinear trailing edge, with an aircraft tail assembly configuration and having a hinge line for a rudder or elevator and wherein the distance between the leading edge and the hinge line is not a constant percentage of the chord at each location along the span and wherein the assembly comprises curvilinear front and rear spars having a constant percentage of the chord at each location along the span.

2. An aircraft tail assembly according to claim 1, wherein the leading edge trailing edge are convex curvilinear.

3. An aircraft tail assembly according to claim 1, wherein the leading edge and trailing edge are concave curvilinear.

4. An aircraft tail assembly according to claim 1 wherein the leading edge is convex curvilinear and the trailing edge is concave curvilinear.

5. An aircraft tail assembly according to claim 1 wherein the leading edge is concave curvilinear and the trailing edge is convex curvilinear.

6. An aircraft tail assembly according to claim 1, wherein the distance between the leading edge and the hinge line has been optimized by computer fluid dynamics.

7. An aircraft tail assembly, having a chord and a span, which assembly comprises a curvilinear leading edge and a curvilinear trailing edge, with an aircraft tail assembly configuration and having a hinge line for a rudder or elevator wherein the distance between the leading edge and the hinge line is not a constant percentage of the chord at each location along the span and which comprises curvilinear front and rear spars tracing a non-constant percentage curve which has been optimized by computer computation and wherein the leading edge, the trailing edge and the hinge line position are also optimised by computer computation.

8. An aircraft tail assembly according to claim 7, wherein the curvilinear front and rear spars trace a non-constant percentage curve which has been optimized by computer fluid dynamics computation or computer structural analysis computation or a combination thereof.

9. An aircraft tail assembly according to claim 7, wherein the leading edge, the trailing edge and the hinge line position have been optimized by computer fluid dynamics computation or computer structural analysis computation or a combination thereof.

10. An aircraft tail assembly according to claim 7, wherein the distance between the leading edge and the hinge line has been optimized by computer fluid dynamics.

11. An aircraft tail assembly having a chord and a span, said assembly comprising a leading edge (21) and a trailing edge (22, and having a hinge line for a rudder or elevator wherein the distance between the leading edge and the hinge line is not a constant percentage of the chord at each location along the span and wherein the assembly comprises curvilinear front and rear spars having a constant percentage of the chord at each location along the span.

12. An aircraft tail assembly according to claim 11, wherein said leading edges and trailing edges are rectilinear.

13. An aircraft tail assembly according to claim 11, wherein the distance between the front and rear spars is a constant percentage of the chord at each location along the span wherein the location of said spars along the span has been optimized by computer computation and wherein the leading edge, the trailing edge and the hinge line position are also optimised by computer computation.

14. An aircraft tail assembly, having a chord and a span, said assembly comprising rectilinear leading edges and trailing edges, and having a hinge line for a rudder or elevator wherein in the aircraft tail assembly configuration and wherein the distance between the leading edge and the hinge line is not a constant percentage of the chord at each location along the span and wherein the assembly comprises curvilinear front and rear spars and wherein the distance between the spars is not a constant percentage of the chord at each location along the span.

15. An aircraft tail assembly according to claim 14, wherein the distance between the leading edge and the hinge line has been optimized by computer fluid dynamics.

16. An aircraft tail assembly having a chord and a span, which assembly comprises a curvilinear leading edge and a curvilinear trailing edge, with an aircraft tail assembly configuration and having a hinge line for a rudder or elevator and wherein the distance between the leading edge and the hinge line is not a constant percentage of the chord at each location along the span and wherein the assembly comprises curvilinear front and rear spars having a constant percentage of the chord at each location along the span wherein the location of said curvilinear front and rear spars has been optimized by computer computation and wherein the leading edge, the trailing edge and the hinge line position are also optimised by computer computation.

17. An aircraft tail assembly having a hinge line for a rudder or elevator wherein in the aircraft tail assembly configuration, and wherein the distance between the leading edge and the hinge line is not a constant percentage of the chord at each location along the span and wherein the assembly comprises curvilinear front and rear spars having a constant percentage of the chord at each location along the span has been optimized by computer computation and wherein the leading edge, the trailing edge and the hinge line position are also optimised by computer computation.

18. An aircraft tail assembly comprising a rectilinear leading edge and a rectilinear trailing edge and having a hinge line for a rudder or elevator wherein the distance between the leading edge and the hinge line is not a constant percentage of the chord at each location along the span and wherein the assembly comprises curvilinear front and rear spars having a constant percentage of the chord at each location along the span wherein the location of said spars along the span has been optimized by computer computation and wherein the leading edge, the trailing edge and the hinge line position are also optimised by computer computation.

* * * * *